(12) United States Patent
Huang (10) Patent No.: US 11,240,115 B2
(45) Date of Patent: Feb. 1, 2022

(54) NETWORK TOPOLOGY DISPLAY METHOD AND NETWORK MANAGEMENT DEVICE

(71) Applicant: New H3C Technologies Co., Ltd., Hangzhou (CN)

(72) Inventor: Hao Huang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 0 days.

(21) Appl. No.: 16/760,350

(22) PCT Filed: Nov. 1, 2018

(86) PCT No.: PCT/CN2018/113515
§ 371 (c)(1),
(2) Date: Apr. 29, 2020

(87) PCT Pub. No.: WO2019/085975
PCT Pub. Date: May 9, 2019

(65) Prior Publication Data
US 2021/0044484 A1   Feb. 11, 2021

(30) Foreign Application Priority Data
Nov. 1, 2017   (CN) .......................... 201711058255.3

(51) Int. Cl.
G06F 15/173   (2006.01)
H04L 12/24    (2006.01)

(52) U.S. Cl.
CPC .................................. H04L 41/12 (2013.01)

(58) Field of Classification Search
CPC ...................................................... H04L 41/12
See application file for complete search history.

(56) References Cited

U.S. PATENT DOCUMENTS

2014/0098673 A1* 4/2014 Lee ...................... H04L 45/126
                                                              370/238
2016/0291839 A1* 10/2016 Tashiro ................... H04L 41/22
2016/0357416 A1   12/2016 Abuduweili et al.

FOREIGN PATENT DOCUMENTS

CN   101035023   9/2007
CN   101304332   11/2008
(Continued)

OTHER PUBLICATIONS

International Search Report and Written Opinion issued in corresponding PCT Application No. PCT/CN2018/113515, dated Jan. 18, 2019 (English Translation of International Search Report provided).

*Primary Examiner* — Wing F Chan
*Assistant Examiner* — Joseph R Maniwang
(74) *Attorney, Agent, or Firm* — Norton Rose Fulbright US LLP (57) ABSTRACT

A method of displaying network topology and a network management device are disclosed. The method includes: determining a sub-network that can be abstracted from the original network topology, wherein the sub-network includes at least two network devices as well as a network link and a network interface between the at least two network devices; abstracting the at least two network devices, as well as the network link and the network interface between the at least two network devices included in the sub-network and obtaining a virtual network device; and displaying a current network topology, the current network topology including the virtual network device which is generated after abstracting the sub-network.

15 Claims, 6 Drawing Sheets

(56) References Cited

FOREIGN PATENT DOCUMENTS

| CN | 101729353 | 6/2010 |
|---|---|---|
| CN | 104683135 | 6/2015 |
| CN | 104967529 | 10/2015 |
| CN | 105487914 | 4/2016 |

* cited by examiner

NETWORK TOPOLOGY DISPLAY METHOD AND NETWORK MANAGEMENT DEVICE

CROSS-REFERENCE TO RELATED APPLICATIONS

The present application is a national phase under 35 U.S.C. § 371 of International Application No. PCT/CN2018/113515, filed Nov. 1, 2018, which claims the benefit of priority to Chinese Patent Application No. CN201711058255.3, filed with the Chinese National Intellectual Property Administration on Nov. 1, 2017 and entitled "Method of displaying network topology and Apparatus", each of which are incorporated herein by reference in their entirety.

BACKGROUND

In the existing network environment, the connection mode between network devices may be referred to as a network topology structure, or abbreviated as a network topology. At the time of constructing a network topology, it is not necessary to take physical properties such as the size and shape of the network devices into consideration. The actual positions and relations between multiple network devices are described using points or lines. The interconnection between multiple network devices within a certain range is represented in the form of a graph.

Network topology is an important content in a network management system. By displaying a network topology, a user may clearly know the current network structure and its network operation status. When the network size is relatively small, accordingly the number of network devices is relatively small, thus the network topology may be presented by the network management device in a relatively comprehensive manner. However, when the network size is relatively large, accordingly the number of network devices is relatively large, therefore, the network management device is allowed to present a rather limited scale of the network topology of network devices. Therefore, a better mode for presenting the network topology is required.

BRIEF DESCRIPTION OF DRAWINGS

In order to more clearly illustrate the technical solutions of the present disclosure or in the prior art, brief introduction is made below on the drawings required to be used in the description of the present disclosure or the prior art. Apparently, the following drawings only illustrate some of the examples described in the present disclosure, and for a person of ordinary skills in the art, other drawings may be obtained from these drawings of the present disclosure.

DETAILED DESCRIPTION

The terminology used in the present disclosure is for the purpose of describing specific examples only and is not intended to limit the present disclosure. The singular form terms "one", "the" and "said" as used in the present disclosure are also intended to include plural forms, unless the context clearly indicates other meanings. It should also be understood that the term "and/or" as used herein refers to any or all possible combinations comprising one or more associated listed items.

It should be understood that although the terms "first", "second", "third", etc. may be used in the present disclosure to describe various information, the information shall not be limited to these terms. These terms are only used for distinguishing the information of the same type from each other. For example, without departing from the scope of the present disclosure, first information may also be referred to as second information, and similarly, second information may also be referred to as first information, depending on the context. In addition, the term "if" used may be interpreted as "at the time of . . . ", "when" or "in response to the determination".

The present disclosure provides a method of displaying network topology, which is applicable to a network management device. The network management device is a necessary device for the operation of network management. A network management device may be a router, a switch, a load balancer, etc. In a network environment, a network management device can identify the connection relation between the network devices and acquire a network topology by utilizing the connection relation between the network devices. For convenience of differentiation in the following description, when a network topology is acquired, it is referred to as an original network topology, i.e., actual network topology. All network devices in a network environment are comprised in the original network topology, and the original network topology is able to realistically embody the connection relation between all the network devices.

In view of the problem that when the network size is relatively large, the number of network devices is relatively large, and only a limited number of network devices can be presented in a network topology, in order to present more network devices in the display of the network topology, the network management device may not display the original network topology, instead, the network management device firstly abstract the original network topology by abstracting at least two network devices comprised in the original network topology, as well as the network links and network interfaces between the at least two network devices. In this manner, virtual network devices are obtained, and the original network topology is converted into a current network topology, wherein the current network topology comprises virtual network devices generated after the abstraction. The network management device may achieve the object of presenting more network devices by means of displaying the current network topology.

In the above, the current network topology may comprise some of the network devices initially in the original network topology, thereby presenting a suitable number of network devices, for example, it is feasible to preset a threshold for number of devices, in the current network topology, a plurality of network devices initially in the original network topology that do not exceed the threshold for number of devices are displayed, so as to prevent the presentation of numerous network devices in the current network topology, thereby avoiding the problems such as complexity of the network topology.

Figure 1:
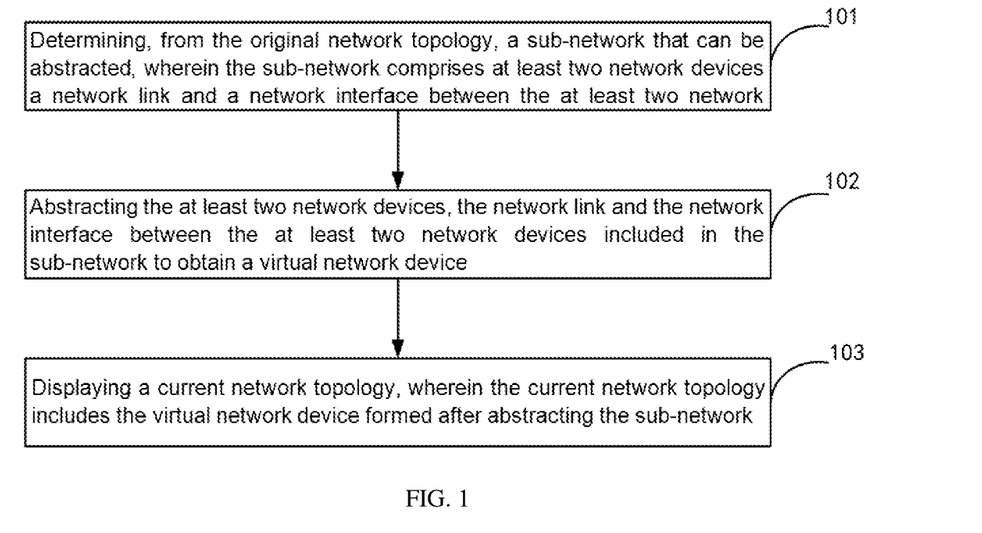
FIG. 1 is a flowchart of a method of displaying network topology in an example of the present disclosure.

Referring to FIG. 1, FIG. 1 is a flowchart of a method of displaying network topology provided in the present disclosure. The method may be applied to a network management device, and may comprise the following:

At block 101, determining a sub-network that can be abstracted from the original network topology, wherein the sub-network comprises at least two network devices, as well as a network link and a network interface between the at least two network devices.

Figure 2A:
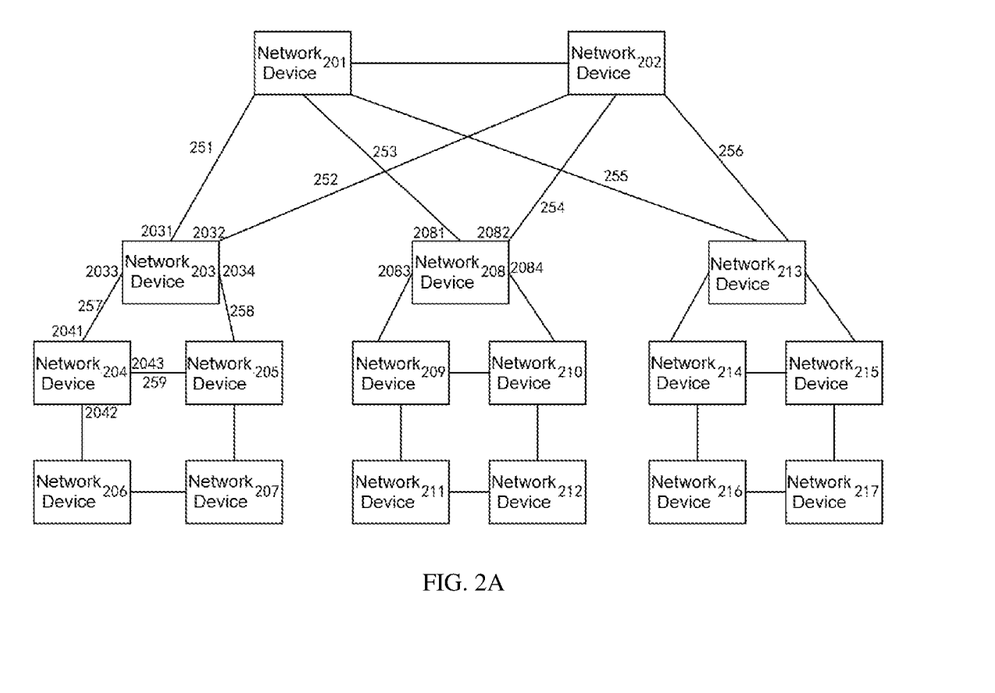
FIG. 2A to FIG. 2I are schematic diagrams of application scenarios in an example of the present disclosure.

Referring to FIG. 2A, FIG. 2A is a schematic diagram of an original network topology provided in the present disclosure.

In the original network topology, network devices, network links and network interfaces are comprised. The nodes in the original network topology may be represented as network devices, such as routers, switches, etc. The types of network devices are not limited in the present disclosure. In FIG. 2A, the network devices comprise a network device 201, a network device 202, a network device 203, etc.

A network link is a connection link between the network devices. That is, two network devices are connected via a network link. In FIG. 2A, the network device 201 and the network device 203 are connected via a network link 251, the network device 202 and the network device 203 are connected via a network link 252, the network device 201 and the network device 208 are connected via a network link 253, and so on. In FIG. 2A, only the reference signs of some network links are shown for ease of illustration, and the reference signs of other network links will not be described in detail.

A network interface (including an entry interface and an exit interface) is an interface through which one network device is connected with another network device, that is, one network device is correspondingly connected with an entry interface of another network device through its own exit interface. The corresponding connection between the exit interface and the entry interface forms a connection link between the network devices, and interactive communication between the network devices is realized by the connection link. In FIG. 2A, the network device 203 is connected with the network device 201 through a network interface 2031, the network device 203 is connected with the network device 202 through a network interface 2032, the network device 203 is connected with the network device 204 through a network interface 2033 and so on. In FIG. 2A, only the reference signs of some network interfaces are shown for ease of illustration, and the reference signs of the other network interfaces will not be described in detail.

Figure 2B:
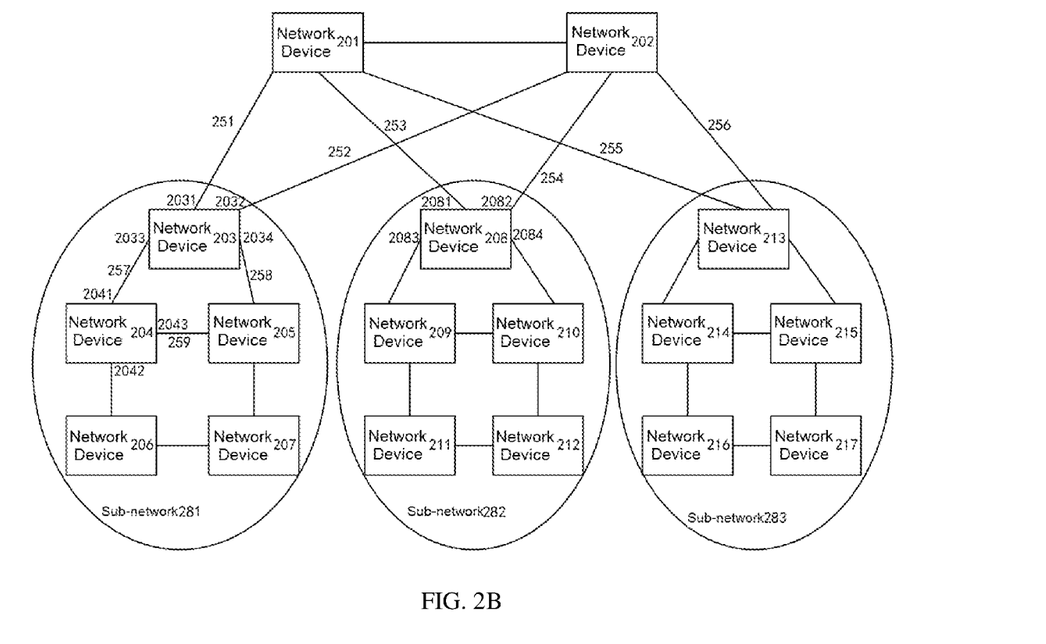
Figure 2C:
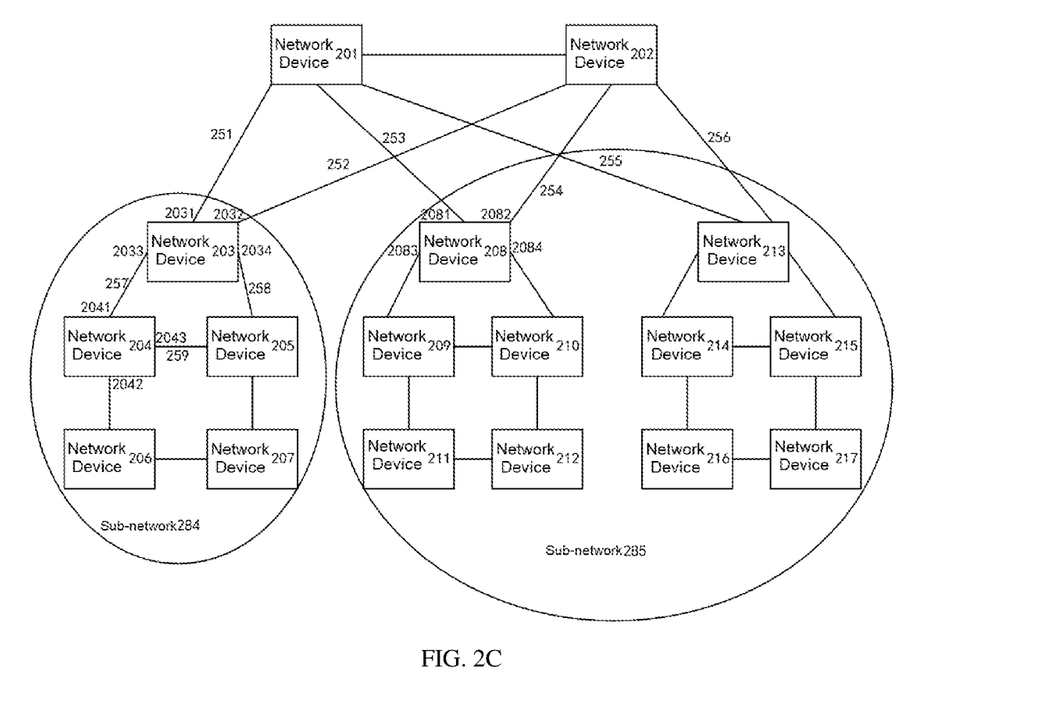

FIG. 2B and FIG. 2C illustrate two examples of sub-networks determined by the network management device.

Referring to FIG. 2B, three sub-networks are comprised, i.e., a sub-network 281, a sub-network 282 and a sub-network 283, wherein the sub-network 281 is taken as an example, the sub-network 281 comprises network devices from 203 to 207, network links and network interfaces between the network devices from 203 to 207, for example, the network links (such as a network link 257) and the network interfaces (such as a network interface 2033 and a network interface 2041) between the network device 203 and the network device 204, the network links (such as a network link 258) and the network interfaces (such as a network interface 2034) between the network device 203 and the network device 205, and so on. As to the sub-network 282 and the sub-network 283, no detailed description is made herein.

Referring to FIG. 2C, two sub-networks are comprised, i.e., the two sub-networks are a sub-network 284 and a sub-network 285, wherein the sub-network 284 comprises network devices from 203 to 207, and network links and network interfaces between the network devices from 203 to 207. The sub-network 285 comprises network devices from 208 to 217, and network links and network interfaces between the network devices 208 to 217.

FIG. 2B and FIG. 2C illustrate the examples of sub-networks of the original network topology shown in FIG. 2A. Network devices 201 and Network devices 202 exist in the original network topology, the two network devices are not classified into sub-networks. In practical applications, the network device 201 and the network device 202 may be classified into one sub-network, which is not limited herein. It should be understood that there may be other classification modes for the original network topology shown in FIG. 2A. For example, the network devices from 203 to 217 may also classified into one sub-network, four sub-networks, five sub-networks, etc., which is not limited in the present disclosure.

FIG. 2B and FIG. 2C illustrate an example where there are network links and network interfaces between network devices. It should be understood that in practical applications, there may be no network links or network interfaces between the network devices in a sub-network. For example, there may not be network links or network interfaces between the network device 203 and the network device 204/205, there may be no network links or network interfaces between the network device 204 and the network device 205/206, there may be no network links or network interfaces between the network device 205 and the network device 207, and so on.

Figure 2D:
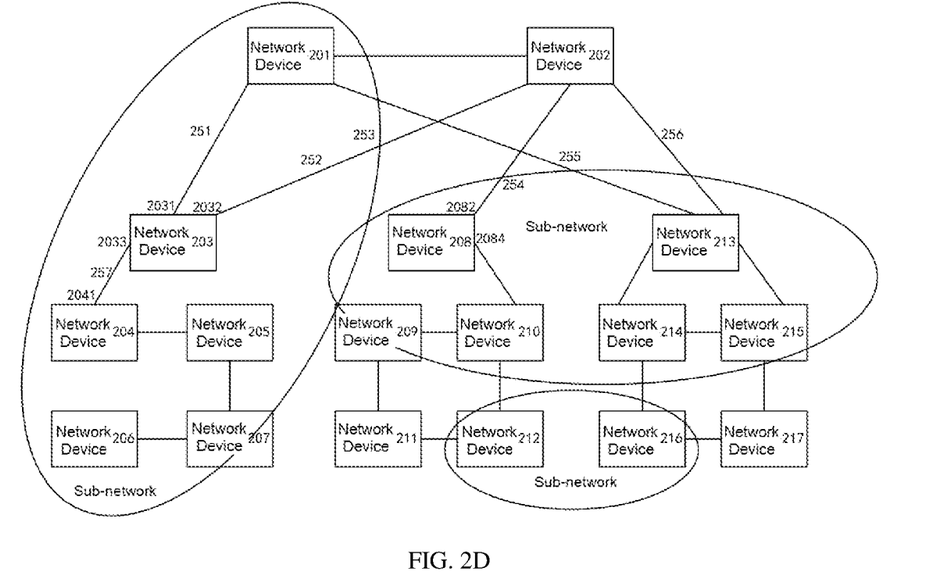
Figure 2E:
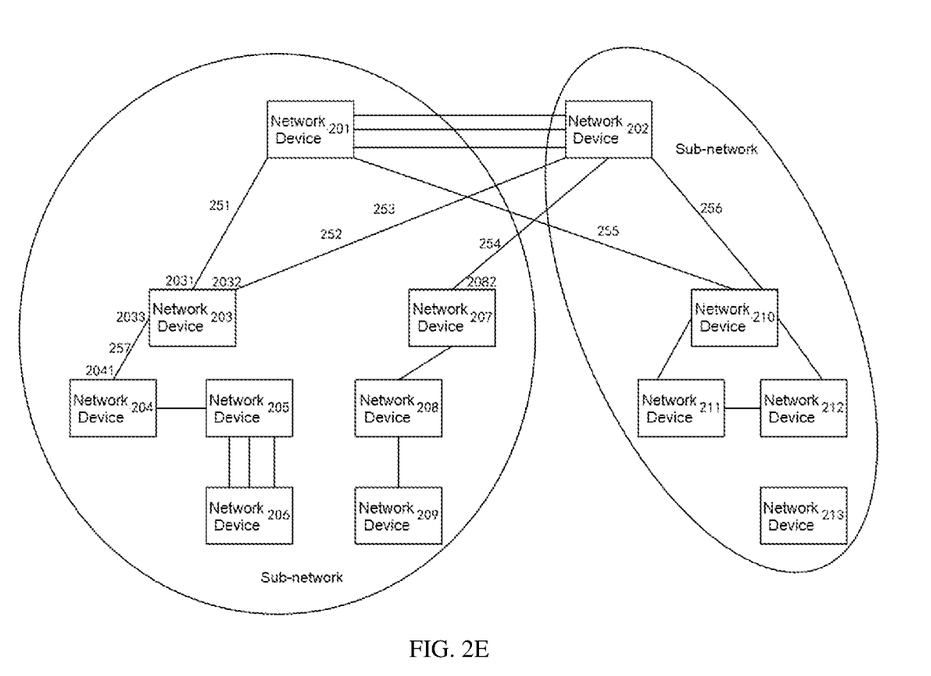

FIG. 2D and FIG. 2E illustrate other several examples of performing classification on sub-networks for different original network topologies, and the classification of sub-networks is not limited herein. Here, The original network topologies corresponding to FIG. 2D and FIG. 2E differ from that of FIG. 2A, which is not limited herein.

For convenience of description, in the following, description is made taking the sub-networks shown in FIG. 2B and FIG. 2C as an example.

At block 102, abstracting the at least two network devices, as well as the network links and the network interfaces between the at least two network devices comprised in the sub-network and obtaining a virtual network device.

Specifically, the network management device performs combination (superimposition) processing on the at least two network devices, as well as on the network links and network interfaces between the at least two network devices comprised in the sub-network, thus a virtual network device is obtained. The combination (superimposition) processing may be equating all elements (network devices, network links, network interfaces) comprised in the sub-network as one element, i.e., a virtual network device, and the network management device represents the sub-network with the virtual network device.

In the present disclosure, the combination (superimposition) processing may also be reducing all elements (network devices, network links, network interfaces) comprised in the sub-network according to a preset rule to further obtain a virtual network device, and the network management device uses the reduced virtual network device to represents the sub-network.

In the above, the preset rule can be set flexibly. For example, the preset rule may be reducing all elements (network devices, network links, network interfaces) comprised in the sub-network by a certain ratio, e.g., reducing all the elements to one half, one third, two fifths, three tenths etc. of the number of original elements. In another example, when the original network topology cannot be entirely displayed in an interface, the preset rule may be reducing respectively each sub-network in the original network topology according to the size of the interface enabling to display the network topology, so that a reduced current network topology can be entirely displayed in the interface. In a further example, the preset rule may be set by a user, e.g., the user sets that every n network devices in the sub-network be combined into one virtual network device, wherein n is greater than or equal to 2.

At block 103, displaying a current network topology, wherein the current network topology comprises the virtual network device which is generated after abstracting the sub-network.

In the above, for one sub-network, it is possible that a virtual network devices, instead of all the network devices, network links and network interfaces initially in the sub-network, is comprised the current network topology, and the virtual network device is a logical network device composed of these network devices, network links and network interfaces, the virtual network device is an abstraction of this sub-network rather than a real network device.

Accordingly, in the displayed current network topology, the virtual network device which is generated after abstracting the sub-network, instead of the original sub-network, is displayed. Thus, what is displayed by the network management device to the user is the network topology after the abstraction, rather than the original network topology. In this way, it is possible to present more network devices, to improve the use experience of the user, and improve the value of the network topology.

Figure 2F:
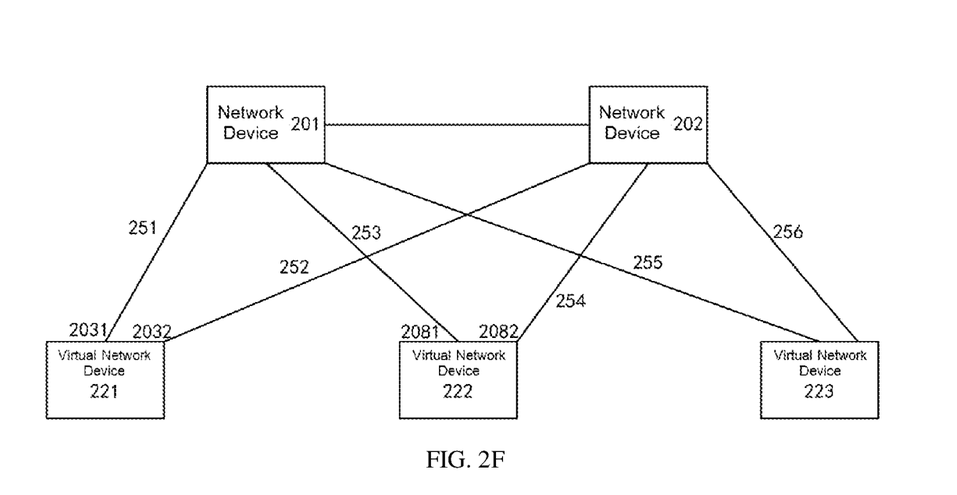

Referring to FIG. 2B, after the network management device combines the network devices, as well as the network links and the network interfaces in the sub-network 281 into a virtual network device 221, combines the network devices, as well as the network links and the network interfaces in the sub-network 282 into a virtual network device 222, and combines the network devices, as well as the network links and the network interfaces in the sub-network 283 into a virtual network device 223, the current network topology may be as shown in FIG. 2F, i.e., FIG. 2F is the current network topology displayed by the network management device to the user.

Figure 2G:
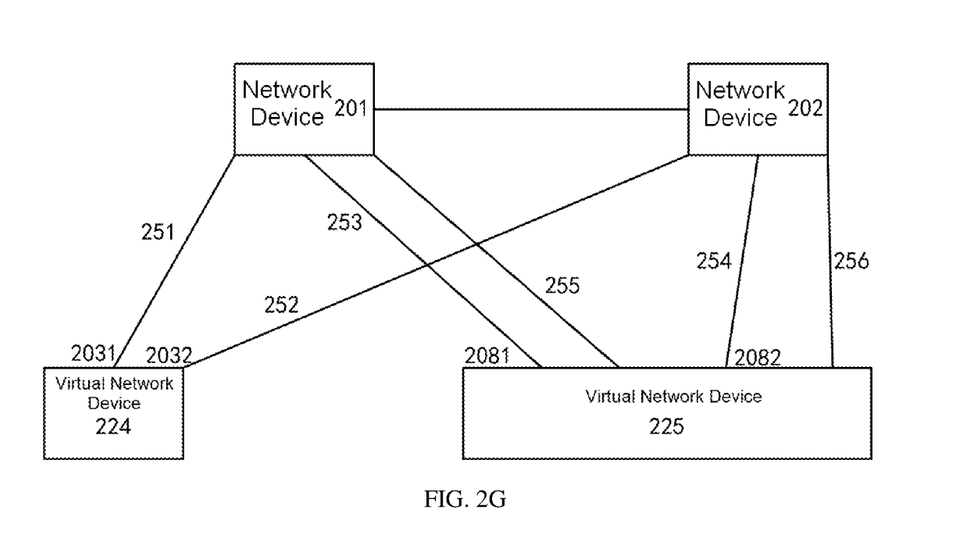

In addition, referring to FIG. 2C, after the network management device combines the network devices, as well as the network links and the network interfaces in the sub-network 284 into a virtual network device 224, and combines the network devices, as well as the network links and the network interfaces within a sub-network 285 into a virtual network device 225, the current network topology is as shown in FIG. 2G, e.g., FIG. 2G is the current network topology displayed by the network management device to the user.

In the method of displaying network topology provided in the present disclosure, multiple network devices, network links and network interfaces in a sub-network are abstracted to obtain a virtual network device, and the virtual network device, instead of the original sub-network, is displayed in the current network topology. Thus, what is displayed by the network management device to the user is the network topology after the abstraction, rather than the original network topology, and therefore, it is possible to present more network devices, to improve the use experience of the user, and improve the value of the network topology.

The technical solutions of the examples of the present disclosure will be described more clearly below.

Optionally, prior to block 101, the network management device may first acquire the original network topology. The process of "the network management device acquiring the original network topology" may include, but is not limited to, the following modes:

The network management device may acquire the original network topology based on the Simple Network Management Protocol (abbreviation: SNMP), the network management device may acquire the original network topology based on a general protocol, and the network management device may acquire the original network topology based on a routing protocol, etc. The network management device may query the connection relation between the network devices using a mode described above, and acquire the original network topology by using the connection relation between the network devices. Evidently, the network management device may also acquire the original network topology using other modes, which is not limited herein.

In one example, the process of "the network management device determining a sub-network that can be abstracted from the original network topology" may include, but is not limited to: the network management device acquiring attribute information of each network device in the original network topology and determining a network as a sub-network, wherein the network is composed of network devices, as well as network links and network interfaces between the network devices, which network devices have the same attribute information, wherein the sub-network is a network that can be abstracted.

In the above, the attribute information of the network devices may include, but is not limited to, one or any combination of the following: level information of the network devices, location information of the network devices, and group information of the network devices.

In one example, in the original network topology, different network devices may have the same or different level information. Based on this, the network management device classifies the network devices which have the same level information into a single sub-network, and classifies the network devices having different level information into different sub-networks.

The level information of the network devices may be classified based on the type of the network device, e.g., an access layer device, a convergence layer device, a core layer device, etc.

Assuming that in FIG. 2A the network device 201 and the network device 202 are core layer devices and the network devices from 203 to 217 are access layer devices, the network management device may classify the network device 201 and the network device 202 into one sub-network, i.e., sub-network A, and may classify the network devices from 203 to 217 into another sub-network, i.e., sub-network B.

Alternatively, the level information of the network devices may be classified based on authorities of the network devices, such as authority of administrator, authority of ordinary user, authority of visitor, etc. Assuming that the in FIG. 2A network device 201 and the network device 202 have the authority of administrator and the network devices from 203 to 217 have the authority of ordinary user, the network management device may classify the network device 201 and the network device 202 into one sub-network, i.e., sub-network A, and classify the network devices from 203 to 217 into another sub-network, i.e., sub-network B.

Alternatively, the level information of the network devices may be classified based on the identities of the network devices, e.g., identity of research and development department, identity of marketing department, identity of management department, etc. Assuming that the network device 201 and the network device 202 have the identity of research and development department and the network devices from 203 to 217 have the identity of marketing department, the network management device may classify the network device 201 and the network device 202 into one sub-network, i.e., sub-network A, and classify the network devices from 203 to 217 into another sub-network, i.e., sub-network B.

Evidently, the level information of the network devices may be classified based on other policies, which is not limited in the present disclosure.

In one example, in the original network topology different network devices may correspond to the same or different location information. Based on this, the network management device may classify the network devices which correspond to the same location information into a single sub-network, and classify the network devices which correspond to different location information into different sub-networks.

The location information of the network devices may be classified based on the regions of the network devices, e.g., North China, East China, South China, Northeast China, etc. Assuming that the network device 201 and the network device 202 are located in the region of North China and the network devices from 203 to 217 are located in the region of South China, the network management device may classify the network device 201 and the network device 202 into one sub-network, i.e., sub-network A, and classify the network devices from 203 to 217 into another sub-network, i.e., sub-network B.

Alternatively, the location information of the network devices may be classified based on the location of the devices, e.g., Beijing Municipality, Tianjin Municipality, Shanghai Municipality, Guangdong Province, Sichuan Province, etc. Assuming that the network device 201 and the network device 202 are located in Beijing Municipality and the network devices from 203 to 217 are located in Shanghai Municipality, the network management device may classify the network device 201 and the network device 202 into one sub-network, i.e., sub-network A, and classify the network devices from 203 to 217 into another sub-network, i.e., sub-network B.

Evidently, the location information of the network devices may be classified based on other policies, which is not limited in the present disclosure.

In one example, in the original network topology, different network devices may correspond to the same or different group information. Based on this, the network management device may classify the network devices which correspond to the same group information into a single sub-network, and classify the network devices which correspond to different group information into different sub-networks.

The group information of the network devices may be classified based on the number of network devices, e.g., the network management device may classify every 5 network devices into a single group. For example, the network management device classifies the network devices from 1 to 5 into group 1, the network management device classifies the network devices from 6 to 10 into group 2, and the network management device classifies the network devices from 11 to 15 into group 3, and so on. In this way, since the network devices from 1 to 5 have the same group information, the network management device may classify the network devices from 1 to 5 into the sub-network A, similarly, the network management device may classify the network devices from 6 to 10 into the sub-network B, and the network management device classifies the network devices from 11 to 15 into the sub-network C, and so on.

In the above examples, several implementations of determining the sub-networks by the network management device are given, evidently there may be other ways, which is not limited herein. For example, the network management device may further receive a command input by the user and determine a sub-network that can be abstracted according to the command, the command may carry the information of the network devices that need to be classified into a single sub-network, for example, the command may carry the information of classifying the network devices from 203 to 207 into one sub-network, classifying the network devices from 208 to 217 into another sub-network, and so on, then according to the command input by the user, the network management device obtains, by parsing, the sub-network classification information, e.g., the information of classifying the network devices from 203 to 207 into the sub-network A and classifying the network devices from 208 to 217 into the sub-network B, so as to perform sub-network classification according to the sub-network classification information obtained by parsing.

In one example, after "the network management device determines a network link between a sub-network and a first network device as a network link between a virtual network device and the first network device", if there are at least two network links between the virtual network device and the first network device, the network management device may further combines the at least two network links into one virtual network link; alternatively, the at least two network links may also be retained.

In one example, after "the network management device determines a network interface where a sub-network is connected with the first network device as a network interface between a virtual network device and the first network device", if at least two network interfaces are connected between the virtual network device and the first network device, the network management device may further combines the at least two network interfaces into one virtual network interface; alternatively, the at least two network interfaces may also be retained.

For example, referring to FIG. 2C and FIG. 2G, for a virtual network device 225, there are two network links and two network interfaces between the virtual network device 225 and the network device 201, and there are also two network links and two network interfaces between the virtual network device 225 and the network device 202.

Based on this, referring to FIG. 2G, in one example, the network management device retains the two network links and two network interfaces between the virtual network device 225 and the network device 201. The network management device retains the two network links and two network interfaces between the virtual network device 225 and the network device 202.

Figure 2H:
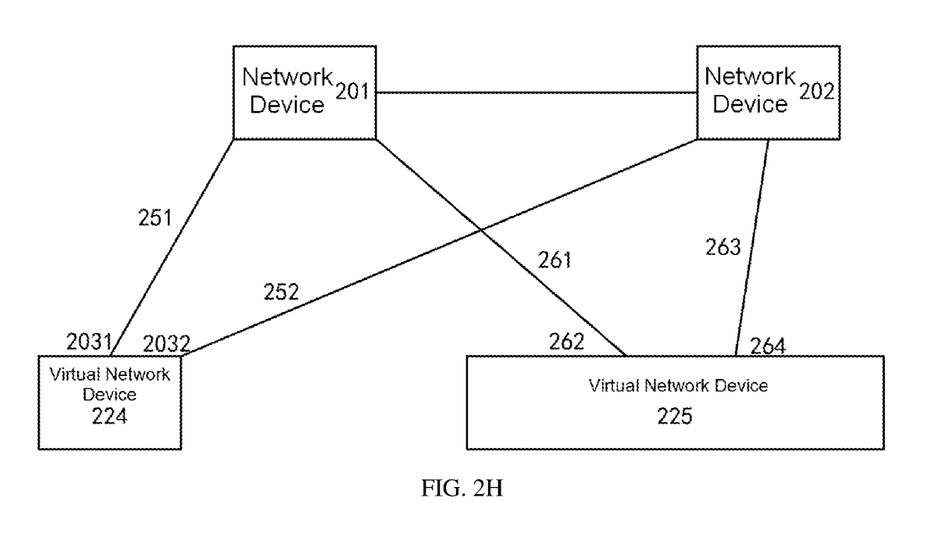

Referring to FIG. 2H, in another example, the network management device combines the two network links between the virtual network device 225 and the network device 201 into a virtual network link 261, combines the two network interfaces between the virtual network device 225 and the network device 201 into a virtual network interface 262, combines the two network links between the virtual network device 225 and the network device 202 into a virtual network link 263, and combines the two network interfaces between the virtual network device 225 and the network device 202 into a virtual network interface 264.

In one example, after the network management device abstracts the at least two network devices, and abstracts the network links and network interfaces between the at least two network devices which are comprised in the sub-network and obtains a virtual network device, the network management device may further abstract the obtained virtual network device. If there are at least two virtual network devices, the network management device may also abstract some, e.g., at least two virtual network devices, and obtain a new virtual network device.

For example, the virtual network device 221 and the virtual network device 222 in FIG. 2F are further abstracted again to obtain a new virtual network device. In this way, the current network topology no longer comprises the virtual network device 221 and the virtual network device 222, but comprises a new virtual network device. No detailed description is made on this process herein.

Similarly, if there are two or more new virtual network devices, the network management device may also continue to abstract some new virtual network devices, and so on, until the desired current network topology is obtained, wherein the desired current network topology can be flexibly set.

For example, if the original network topology cannot be entirely displayed in an interface, the network management device abstracts the at least two network devices, and abstracts the network links and network interfaces between the at least two network devices comprised in the sub-network. After obtaining a virtual network device, the network management device judges if the new network topology can be entirely displayed in the interface, wherein if not, the network management device continues to abstract some virtual network devices until the already abstracted network topology can be entirely displayed in the interface.

In another example, if the number of network devices in the original network topology exceeds the threshold for number of devices, the network management device abstracts the at least two network devices, abstracts and the network links and network interfaces between the at least two network devices comprised in the sub-network. After obtaining a virtual network device, the network management device judges if the number of network devices in the new network topology exceeds the threshold for number of devices, wherein if yes, the network management device continues to abstract some virtual network devices until the number of network devices in the already abstracted network topology is smaller than or equal to the threshold for number of devices.

It will be appreciated that the virtual network device is attributed with the device function and device state of each network device in the sub-network, it is also attributed with the link state of each network link between the network devices in the sub-network, and it is attributed with the interface state of each network interface in the sub-network. Evidently, the virtual network device may also have other functions and information in the sub-network, which are not limited herein.

For example, assuming that the network device 203 in the sub-network 281 is provided with a forwarding function, the network devices from 204 to 206 have a calculation function, and the network device 207 is provided with a storage function, then the virtual network device 221 may have the device functions of these network devices, i.e., have the forwarding function, the calculation function and the storage function.

Assuming that the device state of the network device 203 is an offline state, the device state of the network devices from 204 to 206 is an online state, and the device state of the network device 207 is malfunction, then the virtual network device 221 may have the device states of these network devices, that is, the device state of the virtual network device 221 may comprise the offline state, the online state, the malfunction state, etc. Based on the device state of the virtual network device 221, it can be known that in the sub-network 281 corresponding to the virtual network device 221, there exist a network device whose device state is the offline state, a network device whose device state is the online state, and a network device whose device state is the malfunction state.

Assuming that the link state of the network link 257 between the network device 203 and the network device 204 is the malfunction state, the link state of the network link 258 between the network device 203 and the network device 205 is the normal state, and so on. Based on this, the virtual network device 221 may have the link states of these network links, that is, the link state of the virtual network device 221 may comprise the normal state, the malfunction state, etc. Based on the link state of the virtual network device 221, it can be known that in the sub-network 281 corresponding to the virtual network device 221, there exist a malfunctioning network link and a normal network link.

Assuming that the interface state of the interface 2033 of the network device 203 is UP (normal), the interface state of the interface 2034 is DOWN (malfunction), and so on, the virtual network device 221 is attributed with the interface states of these network interfaces, that is, the interface state of the virtual network device 221 comprises the states such as UP and DOWN. Based on the interface states, it is known that in the sub-network 281 corresponding to the virtual network device 221, there exist an interface having the UP state and an interface having the DOWN state.

It will be appreciated that after the network management device combines the at least two network links into a virtual network link, the virtual network link is attributed with one or any combination of the following information of the at least two network links: a bandwidth of the link, traffic of the link and a state of the link. Evidently, the virtual network link is also provided with other functions and information, which are not limited herein.

For example, after the network management device combines the two network links between the virtual network device 225 and the network device 201 into a virtual network link 261, the bandwidth of the link of the virtual network link 261 is the sum of the bandwidths of the links of the above two network links; the traffic of the link of the virtual network link 261 is the sum of the traffic of the links of the two networks; and the link state of the virtual network link 261 is the link state of the above two network links.

After the network management device combines the at least two network interfaces into one virtual network interface, the virtual network interface may have one or any combination of the following information of the at least two network interfaces: a rate of the interface and an interface state. Evidently, the virtual network interface may also have other functions and information, which are not limited herein.

For example, after the network management device combines the two network interfaces between the virtual network device 225 and the network device 201 into a virtual network interface 262, the rate of interface of the virtual network interface 262 is the sum of the rates of the interfaces of the two network interfaces; and the interface state of the virtual network interface 262 is the interface state of the two network interfaces.

Based on the above technical solutions, in the present disclosure, when the network size is relatively large and the number of network devices is relatively large, the network management device may abstract the network devices, network links and network interfaces in the sub-network and obtain a virtual network device, and display, in the current network topology, the virtual network device which is generated after abstracting the sub-network.

In the above, it is possible to flexibly set the conditions for judging if the network size is relatively large and if the number of network devices is relatively large. For example, in accordance with interfaces having different sizes, corresponding threshold for number of devices may be set separately. For different interfaces, the threshold for number of devices corresponding thereto may be found. If the number of network devices in the network topology exceeds the found threshold for number of devices, the network management device determines that the network size is relatively large and the number of network devices is relatively large. For example, if the size of a certain interface is 19 inches and the preset threshold for number of devices corresponding to the 19-inch interface is 100, then if the number of network devices in the network topology exceeds 100, it is determined that the network size is relatively large and the number of network devices is relatively large. Thus, what is displayed by the network management device to the user is the network topology after the abstraction, rather than the original network topology. The network management device may also control the number of network devices in the original network topology which are to be displayed so as to present a suitable number of network devices, thereby preventing the presentation of numerous network devices and avoiding the problems such as complexity of the network topology. Moreover, although the presented current network topology is a network topology after abstraction, the current network topology can entirely present valid information in the original network topology, and the original network topology is converted into the current network topology without reducing the presented information, which can effectively meet the needs of topology management and presentation of large-size networks, improve the use experience of the user, and improve the value of the network topology.

Further, the virtual network device may have the device functions and the device states of the network devices in the sub-network, the link state of the network links between the network devices in the sub-network, and the interface state of the network interfaces in the sub-network, the virtual network link of the virtual network device is attributed with the bandwidth of the links, the traffic of the links and the link states of the at least two network links comprised in the virtual network device, and the virtual network interface of the virtual network device is attributed with the rates of the interfaces and the interface states of the at least two network interfaces comprised in the virtual network device. Therefore, the abstracted current network topology can entirely present all of the valid information, which greatly improves the usability of the virtual network topology.

In one example, the network topology of the sub-network may be a topology attribute of a virtual network device. Based on this, after displaying the current network topology, the network management device may further receive a topology expansion request message input by the user, wherein the topology expansion request message comprises identification information of the virtual network device; according to the identification information of the virtual network device, the network management device acquires the network topology of the sub-network corresponding to the virtual network device; and then, the network management device expands and displays the virtual network device as the network topology of the sub-network.

For example, after the network management device abstracts the at least two network devices, as well as the network links and the network interfaces between the at least two network devices which are comprised in the sub-network and obtains a virtual network device, the network management device may also record a corresponding relation between the network topology of the sub-network and the identification information (such as the unique identification of the virtual network device) of the virtual network device. Based on this, after parsing out the identification information of the virtual network device from the topology expansion request message, by means of the recorded corresponding relation between the network topology of the sub-network and the identification information of the virtual network device, the network management device may query the network topology of the sub-network which corresponds to the identification information of the virtual network device, and display the network topology of the sub-network.

Figure 2I:
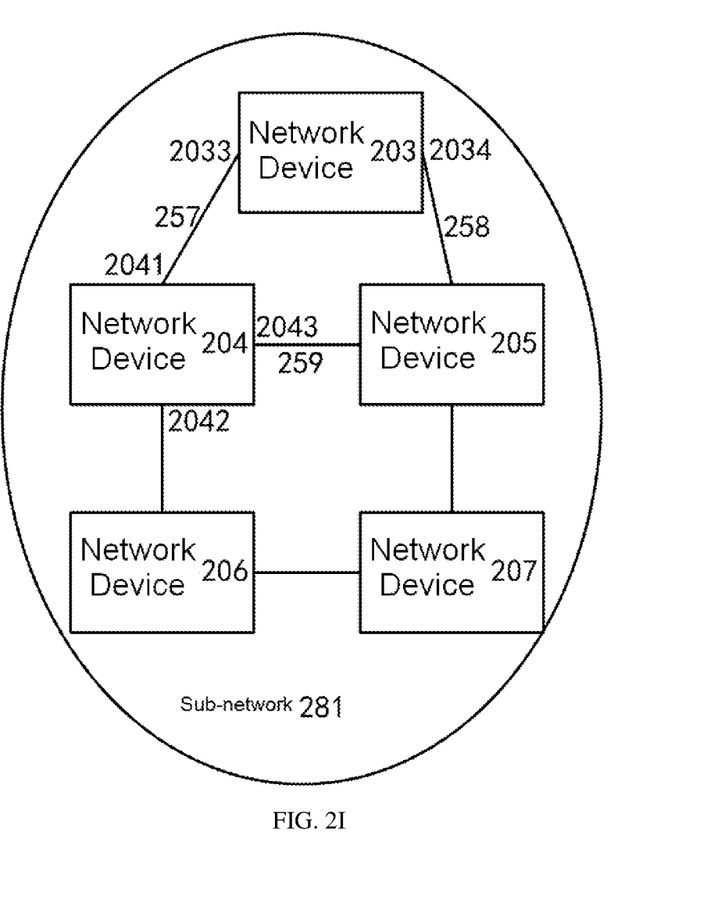

For example, the network topology of the sub-network 281 may be as shown in FIG. 2I, and the network topology of the sub-network 281 may be a topology attribute of the virtual network device 221. Based on this, although the network topology of the sub-network 281 is not shown in the current network topology, if the user needs to view the topology attributes of the virtual network device 221, the network management device receives a request message input by the user which requests expansion of the topology of the virtual network device 221, and according to the identification information of the virtual network device comprised in the topology expansion request message, the network management device acquires the network topology shown in FIG. 2I, and then the network management device displays to the user the network topology shown in FIG. 2I.

After the network management device abstracts the at least two network devices, as well as the network links and the network interfaces between the at least two network devices which are comprised in the sub-network, and obtains a virtual network device, the network management device determines a network link between the determined sub-network and a first network device as a network link between the virtual network device and the first network device; and the network management device determines a network interface which the sub-network and the first network device are connected through as a network interface between the virtual network device and the first network device.

In the above, the first network device in the present disclosure is in the original network topology and is not in the sub-network. The first network device may be a real network device, such as the network device 201, the network device 202, etc. in FIG. 2B, and may also be a virtual network device obtained after abstraction.

As shown in FIG. 2B and FIG. 2F in combination, the network management device abstracts the network devices from 203 to 207 in the sub-network 281, as well as the network links and the network interfaces (such as the network links and network interfaces between the network device 203 and the network device 204, etc.) between the network devices in the sub-network 281 into the virtual network device 221. The network management device determines the network link 251 between the sub-network 281 and the network device 201 as the network link between the virtual network device 221 and the network device 201; and the network management device determines the network interface 2031 through which the sub-network 281 and the network device 201 are connected, as a network interface between the virtual network device 221 and the network device 201. The network management device determines the network link 252 between the sub-network 281 and the network device 202 as a network link between the virtual network device 221 and the network device 202, and determines the network interface 2032 through the sub-network 281 and the network device 202 are connected through as a network interface between the virtual network device 221 and the network device 202.

Evidently, the network management device may also abstract the network devices, as well as the network links and network interfaces between the network devices in the sub-network 282 into the virtual network device 222, and the network management device may also abstract the network devices, as well as the network links and network interfaces between the network devices in the sub-network 283 into the virtual network device 223. The virtual network device 222 and the virtual network device 223 are processed in the same way as the virtual network device 221, which is not repeated herein.

Referring to FIG. 2C and FIG. 2G in combination, the network management device abstracts the network devices, as well as the network links and network interfaces between the network devices in the sub-network 284 into the virtual network device 224. The network management device abstracts the network devices, as well as the network links and network interfaces between the network devices in the sub-network 285 into the virtual network device 225. The virtual network device 224 and the virtual network device 225 are processed in the same way as the virtual network device 221, which is not repeated herein.

Figure 3:
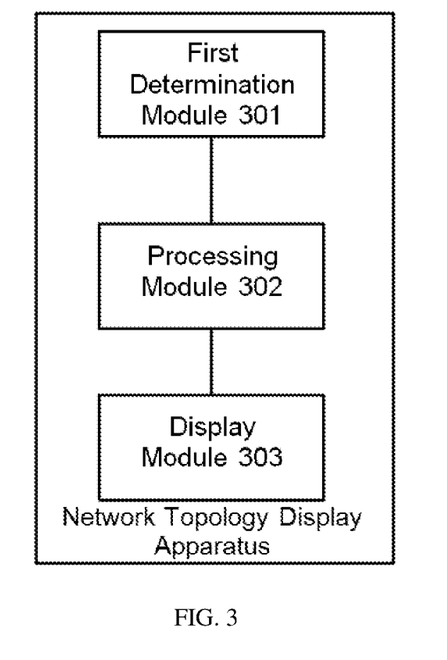
FIG. 3 is a structural diagram of a network topology display apparatus in an example of the present disclosure.

Based on the same application conception as the above-described method, the present disclosure further proposes a network topology display apparatus, which can be applied to a network management device. FIG. 3 is a structural diagram of the network topology display apparatus, wherein the network topology display apparatus comprises a first determination module 301, a processing module 302 and a display module 303.

The first determination module 301 is configured to determine a sub-network that can be abstracted from the original network topology, wherein the sub-network comprises at least two network devices, as well as a network link and a network interface between the at least two network devices.

The processing module 302 is configured to abstract the at least two network devices, as well as the network link and the network interface between the at least two network devices comprised in the sub-network and to obtain a virtual network device.

The display module 303 is configured to display a current network topology, wherein the current network topology comprises the virtual network device which is generated after abstracting the sub-network.

Optionally, the first determination module 301 is specifically configured to acquire attribute information of each network device in the original network topology in the process of determining a sub-network that can be abstracted from the original network topology, and determine a network as a sub-network, wherein the network is composed of the network devices, as well as the network links and the network interfaces between the network devices, which network devices have the same attribute information.

Optionally, the apparatus further comprises a second determination module (not shown) configured to determine a network link between the sub-network and the first network device as a network link between the virtual network device and the first network device; the second determination module is further configured to determine a network interface which the sub-network and the first network device are connected through as a network interface between the virtual network device and the first network device, wherein the first network device is initially located in the original network topology and is not in the sub-network.

Optionally, the apparatus further comprises a combination module (not shown) configured to combine, when there are at least two network links between the virtual network device and the first network device, the at least two network links into one virtual network link; and the combination module is further configured to combine, when at least two network interfaces are connected between the virtual network device and the first network device, the at least two network interfaces into one virtual network interface.

Optionally, the apparatus further comprises a reception module (not shown) configured to receive a topology expansion request message input by a user, the topology expansion request message including identification information of the virtual network device; an acquiring module (not shown) configured to acquire, according to the identification information of the virtual network device, a network topology of the sub-network corresponding to the virtual network device; and the display module 303 is further configured to expand and display the virtual network device as a network topology of the sub-network.

The implementation principle of the network topology display apparatus in the present disclosure is similar to the implementation principle of the preceding method of displaying network topology, and as to the corresponding contents thereof, reference may be made to the preceding method examples, and no further detail description is made herein.

Figure 4:
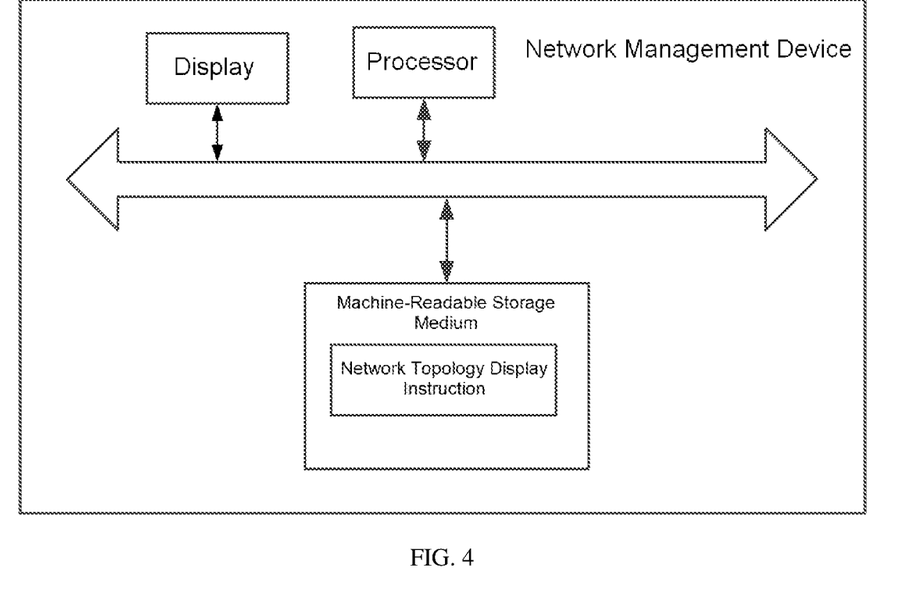
FIG. 4 is a hardware structural diagram of a network management device in an example of the present disclosure.

For the network management device provided in the present disclosure, in terms of hardware, reference may be made to FIG. 4 for the hardware architecture schematic diagram, including a machine-readable storage medium and a processor, wherein:

the machine-readable storage medium stores instruction codes; and the processor communicates with the machine-readable storage medium, and reads and executes the instruction codes stored in the machine-readable storage medium to implement the method of displaying network topology disclosed in the above examples of the present disclosure.

The network management device may further comprise a monitor, wherein the monitor communicates with the processor and displays the current network topology obtained by the display.

Here, the machine-readable storage medium may be any electronic, magnetic, optical or other physical storage devices that may contain or store information, such as executable instructions, data, etc. For example, the machine-readable storage medium may be a random access memory (RAM), a volatile memory, a nonvolatile memory, a flash memory, a storage drive (such as a hard disk drive), a solid state disk, any type of storage disk (such as an optical disk, dvd, etc.), or similar storage mediums, or a combination thereof.

The system, apparatus, modules or units illustrated in the above examples may specifically be implemented by a computer chip or entity, or may be implemented by a product having a certain function. A typical implementation device is a computer, the specific form of which may be a personal computer, a laptop computer, a cellular phone, a camera phone, a smart phone, a personal digital assistant, a media player, a navigation device, an email transceiving device (transmitting-receiving device), a game console, a tablet computer, a wearable device or a combination of any of these devices.

For convenience of description, when describing the above apparatus, it is divided into various units in terms of functions to describe them separately. Evidently, at the time of implementing the present disclosure, the functions of the units may be implemented in a single or multiple software and/or hardware.

Those skilled in the art will appreciate that the examples of the present disclosure may be provided as methods, systems or computer program products. Thus, the present disclosure may take the form of entirely hardware examples, entirely software examples, or software-hardware combination examples. Moreover, the present disclosure may take the form of a computer program product implemented on one or more computer-usable storage mediums (including, but not limited to, disk memories, CD-ROM, optical memories, etc.) containing computer-usable program codes.

The present disclosure is described with reference to the flowcharts and/or block diagrams according to the methods, devices (systems) and computer program products of the present disclosure. It should be understood that each flow and/or block in the flowcharts and/or block diagrams, and a combination of the flows and/or blocks in the flowcharts and/or block diagrams may be implemented by computer program instructions. These computer program instructions may be provided to a general-purpose computer, a special computer, an embedded processor, or the processor of other programmable data processing devices so as to give rise to a machine with the result that the instructions executed by the computer or the processor of other programmable data processing devices give rise to a device that is used to realize the functions specified by one or more flows in the flowchart and/or one or more blocks in the block diagram.

Moreover, these compute program instructions may also be stored in a computer-readable memory capable of directing a computer or other programmable data processing devices to operate in a particular manner, such that the instructions stored in the computer-readable memory produce an article of manufacture comprising an instruction device which implements the functions specified by one or more flows in the flowchart and/or one or more blocks in the block diagram.

These computer program instructions may also be loaded onto a computer or other programmable data processing devices so as to carry out a series of operational steps on the computer or other programmable devices to produce computer-implemented processing, so that the instructions executed on the computer or other programmable devices provide steps for implementing the functions specified by one or more flows in the flowchart and/or one or more blocks in the block diagram.

The above description is merely examples of the present disclosure and is not intended to limit the present disclosure. For a person skilled in the art, the present disclosure may have various changes and variations. Any modifications, equivalent substitutions, improvements, etc. within the spirit and principle of the present disclosure shall all be covered by the scope of protection of the present disclosure.

INDUSTRIAL APPLICABILITY

The method of displaying network topology and the network management device provided in the present disclosure enable the abstraction on multiple network devices, network links and network interfaces in a sub-network to obtain a virtual network device, and the display of the virtual network device which is generated after abstracting the sub-network, instead of the original sub-network, in the current network topology. Thus, what is displayed by the network management device to the user is the network topology after the abstraction, rather than the original network topology, and therefore, it is possible to present more network devices, improve the use experience of the user, and improve the value of the network topology.

The invention claimed is:

1. A method of displaying network topology, applicable to a network management device, comprising:
    determining a sub-network operable to be abstracted in an original network topology, wherein the sub-network comprises at least two network devices, a network link between the at least two network devices, and network interfaces of the at least two network devices;
    abstracting the at least two network devices, the network link and the network interfaces comprised in the sub-network to obtain a virtual network device, wherein the virtual network device has a device function and a device state of each network device in the sub-network, a link state of each network link between the network devices in the sub-network, and an interface state of each network interface in the sub-network; and
    displaying a current network topology comprising the virtual network device generated by abstracting the sub-network.

2. The method according to claim 1, wherein the determining a sub-network operable to be abstracted in an original network topology comprises:
    acquiring attribute information of each network device in the original network topology; and
    determining a network as the sub-network, wherein the network is composed of network devices having same attribute information, a network link or network links between the network devices, and network interfaces of the network devices.

3. The method according to claim 1, wherein after the abstracting the at least two network devices, the network link and the network interfaces comprised in the sub-network to obtain a virtual network device, the method further comprises:
    determining a network link between the virtual network device and a first network device, wherein the network link is initially between the sub-network and the first network device; and
    determining a network interface of the virtual network device to the first network device, wherein the sub-network is connected with the first network device through the network interface,
    wherein the first network device is a network device in the original network topology and outside the sub-network.

4. The method according to claim 3, wherein after the determining a network link between the virtual network device and a first network device, the method further comprises:
    if there are at least two network links between the virtual network device and the first network device, combining the at least two network links into one virtual network link; and
    wherein after the determining a network interface of the virtual network device to the first network device, the method further comprises:

if the virtual network has at least two network interfaces for connecting to the first network device, combining the at least two network interfaces into one virtual network interface.

5. The method according to claim 4, wherein
the virtual network link has one or any combination of a link bandwidth, link traffic and a link state of the at least two network links comprised in the virtual network link; and the virtual network interface has one or any combination of an interface rate and an interface state of the at least two network interfaces comprised in the virtual network interface.

6. The method according to claim 1, wherein after displaying the current network topology, the method further comprises:
receiving a topology expansion request input by a user, wherein the topology expansion request contains identification information of the virtual network device;
acquiring network topology of the sub-network corresponding to the virtual network device according to the identification information of the virtual network device; and
displaying the network topology of the sub-network by expanding the virtual network device.

7. The method according to claim 6, wherein after the abstracting the at least two network devices, the network link and the network interfaces comprised in the sub-network to obtain a virtual network device, the method further comprises:
recording a corresponding relation between the network topology of the sub-network and the identification information of the virtual network device; and
wherein acquiring network topology of the sub-network corresponding to the virtual network device according to the identification information of the virtual network device comprises:
querying the network topology of the sub-network corresponding to the identification information of the virtual network device by means of the recorded corresponding relation between the network topology of the sub-network and the identification information of the virtual network device.

8. The method according to claim 1, wherein after the abstracting the at least two network devices, the network link and the network interfaces comprised in the sub-network to obtain a virtual network device, the method further comprises:
if there are at least two virtual network devices, abstracting the at least two virtual network devices to obtain a new virtual network device; and
wherein the displaying a current network topology comprising the virtual network device generated by abstracting the sub-network, comprises: displaying the current network topology, wherein the current network topology comprises the new virtual network device.

9. A network management device, comprising a machine-readable storage medium, a processor and a display,
wherein the machine-readable storage medium stores instruction codes;
the processor communicates with the machine-readable storage medium, and the processor reads and executes the instruction codes stored in the machine-readable storage medium, and the processor is caused to:
determine a sub-network operable to be abstracted in an original network topology, wherein the sub-network comprises at least two network devices, a network link between the at least two network devices, and network interfaces of the at least two network devices; and
abstract the at least two network devices, the network link and the network interfaces comprised in the sub-network to obtain a virtual network device, wherein the virtual network device has a device function and a device state of each network device in the sub-network, a link state of each network link between the network devices in the sub-network, and an interface state of each network interface in the sub-network; and
the display is caused to display a current network topology comprising the virtual network device generated by abstracting the sub-network.

10. The device according to claim 9, wherein the instruction codes cause the processor to determine the sub-network operable to be abstracted in the original network topology by:
acquiring attribute information of each network device in the original network topology; and
determining a network as the sub-network, wherein the network is composed of network devices having same attribute information, a network link or network links between the network devices, and network interfaces of the network devices.

11. The device according to claim 9, wherein after the abstraction of the at least two network devices, the network link and the network interfaces comprised in the sub-network to obtain the virtual network device, the instruction codes further cause the processor to:
determine a network link between the virtual network device and a first network device, wherein the network link is initially between the sub-network and the first network device; and
determine a network interface of the virtual network device to the first network device, wherein the sub-network is connected with the first network device through the network interface,
wherein the first network device is a network device in the original network topology and outside the sub-network.

12. The device according to claim 11,
wherein after the determination of the network link between the virtual network device and the first network device, the instruction codes further cause the processor to:
if there are at least two network links between the virtual network device and the first network device, combine the at least two network links into one virtual network link; and
wherein after the determination of the network interface of the virtual network device to the first network device, the instruction codes further cause the processor to:
if the virtual network has at least two network interfaces for connecting to the first network device, combine the at least two network interfaces into one virtual network interface.

13. The device according to claim 12, wherein
the virtual network link has one or any combination of a link bandwidth, link traffic and a link state of the at least two network links comprised in the virtual network link; and the virtual network interface has one or any combination of an interface rate and an interface state of the at least two network interfaces comprised in the virtual network interface.

14. The device according to claim 9, wherein after the display displays the current network topology, the instruction codes further cause the processor to:

receive a topology expansion request input by a user, wherein the topology expansion request contains identification information of the virtual network device;

acquire the network topology of the sub-network corresponding to the virtual network device according to the identification information of the virtual network device; and the display is caused to display the network topology of the sub-network by expanding the virtual network device.

15. The device according to claim 14, wherein after the abstraction of the at least two network devices, the network link and the network interfaces comprised in the sub-network to obtain a virtual network device, the instruction codes further cause the processor to:

record a corresponding relation between the network topology of the sub-network and the identification information of the virtual network device; and wherein the instruction codes cause the processor to acquire, according to the identification information of the virtual network device, network topology of the sub-network corresponding to the virtual network device by: querying the network topology of the sub-network corresponding to the identification information of the virtual network device by means of the recorded corresponding relation between the network topology of the sub-network and the identification information of the virtual network device.

* * * * *